United States Patent Office 3,272,748

Patented Sept. 13, 1966

3,272,748

ETCHING OF SILICON AND GERMANIUM

Alfons H. Szkudlapski, Bethlehem, Pa., assignor to Western Electric Company Incorporated, New York, N.Y., a corporation of New York No Drawing. Filed June 29, 1964, Ser. No. 379,015
10 Claims. (Cl. 252—79.3)

This invention relates generally to etching of semiconductive material, and more particularly to etching methods and solutions for the chemical polishing of silicon or germanium used in the manufacture of semiconductive devices. Accordingly, the general objects of the invention are to provide new and improved etching methods and solutions of such character.

In the manufacture of semiconductive devices of silicon or germanium, a chemical etching solution is customarily employed at one or more stages in the process of manufacture, to remove a surface layer of the semiconductive material and provide a smooth surface. In many processes, thin slices of silicon or germanium are to be etched at a relatively slow, controlled rate, after initial mechanical polishing of a conventional type, to obtain a pit-free, mirror-bright surface. One type of etchant which has been widely used in the past, herein termed a "mixed acid etch," consists of a mixture of nitric, hydrofluoric and acetic acids, frequently including a small amount of one of the halogens bromine or iodine.

Another object of the invention is to provide improved etching solutions and methods of the mixed acid type.

Further objects of the invention are to provide improved etching solutions which are inexpensive and easy to prepare, have a long shelf life and do not require aging, have a stable and easily controllable concentration of halogen compound, avoid the formation of vapors at customary etching temperatures, and produce a uniform mirror-bright surface on the semiconductive surface to be etched.

With the foregoing and other objects in view, the present invention relates, in part, to the discovery that many advantages are achieved by the use of the interhalogen compound iodine monobromide in mixed acid etches of the type described, as opposed to the use of either of the constituent halogens alone. In particular, an etchant in accordance with certain features of the invention comprises a mixture of nitric acid, hydrofluoric acid and iodine monobromide, preferably with the addition of acetic acid and/or an excess of bromine beyond the stoichiometric amount required to form iodine monobromide. A method of etching silicon or germanium, in accordance with the invention, comprises the step of treating the surface to be etched with an etchant of the type described in the preceding sentence.

In general, preferred concentrations of the ingredients are within the following ranges:

| | | | |
|---|---|---|---|
| (a) | 70% nitric acid | parts by volume | 1–6 |
| (b) | 49% hydrofluoric acid | do | 1 |
| (c) | Glacial acetic acid | do | 1–10 |
| (d) | Iodine monobromide | grams per liter | 3–10 |

A specific preferred formulation for chemical polishing of silicon is as follows:

| | | | |
|---|---|---|---|
| (a) | 70% nitric acid | parts by volume | 4–5 |
| (b) | 49% hydrofluoric acid | do | 1 |
| (c) | Glacial acetic acid | do | 3–5 |
| (d) | Iodine monobromide | grams per liter | 4–7 |

Other objects, advantages and features of the invention will be apparent from the following detailed description of specific examples and embodiments thereof.

MIXED ACID ETCHES

Various types of chemical etchants for silicon and germanium, including mixed acid etches of the type under consideration here, are described in an article, "Etching of Germanium and Silicon," by P. Wang appearing in The Sylvania Technologist, vol. 1, pp. 50–57, April 1958 (here incorporated by reference). A thorough discussion of the mixed acid etch, and etching theory and technology, is contained in an article entitled, "On the Mechanism of Chemically Etching Germanium and Silicon," by D. R. Turner, published in the Journal of the Electrochemical Society, vol. 107, pp. 810–16, October 1960 (here incorporated by reference). This article also appears as Bell Telephone System Monograph 3695.

In general, neither nitric acid nor hydrofluoric acid alone dissolves appreciable quantities of germanium or silicon; however, any mixture of the two has some effect, silicon being etched at a faster rate than germanium. The etching theory, set out in detail in the Turner article, is that the silicon or germanium dissolves by first forming an oxide, which then reacts with HF to form a water-soluble silicofluoride complex. The reaction is electrochemical in nature; that is, the semiconductor goes into solution at localized anode sites while the oxidizing agent ($HNO_3$) is reduced at local cathodic areas. The overall reaction is believed to be as follows:

$$3Si+4HNO_3+18HF\rightarrow 3H_2SiF_6+4NO+8H_2O$$

As is apparent from the above equation, the maximum dissolving power (etching rate) occurs when the mol ratio of $HF/HNO_3$ is 18/4, or 4.5/1. This corresponds to a solution containing approximately 67% by weight of a 49% HF solution and 33% by weight of a 70% $HNO_3$ solution, and the etching rate decreases on both sides of the maximum. For convenience, the solution concentrations are customarily expressed in terms of parts by volume of the components, the 49% and 70% acids mentioned being customarily used, since they are the strongest standard concentrations available commercially.

Although the present invention may be practiced with any operable ratio of $HNO_3$ to HF, the maximum rate is far too fast for polishing applications, and the mixtures customarily employed feature a relatively high ratio of $HNO_3$ to HF, with faster etching rates being achieved as the concentration of HF is increased. In general, the range usually employed in the chemical polishing of silicon is about 3–6 parts by volume of 70% $HNO_3$ to 1 part by volume of 49% HF, and for germanium about 1–2.5 parts by volume of 70% $HNO_3$ to 1 part by volume of 49% HF.

While etching can be performed with $HNO_3$–HF mixtures alone, more uniform etching is achieved by adding a substantially nonaqueous diluent or moderating agent, such as glacial acetic acid (99.5% by weight). The function of acetic acid in the etching of silicon or germanium is not fully understood. Although the acetic acid is not believed to take part in the reaction, it definitely enhances the etching effect. Solutions diluted with water etch at a faster rate, and thus are less desirable for chemical polishing at a slow, controlled rate. Therefore, the amount of water is kept to a practical minimum supplied by the "concentrated" $HNO_3$ and HF solutions used. The amount of acetic acid may be varied within wide limits, in the practice of the invention, the preferred range being between about 50 to 400 volumes of glacial acetic acid to 100 volumes of the $HNO_3$ and HF solutions, combined.

It is also advantageous to add a small amount of acetic anhydride to the solution, which reacts with the water present to form additional acetic acid, thereby lowering the water concentration and increasing the solution temperature, since the reaction is exothermic. In this manner, preheating of the solution is minimized.

As disclosed in the Wang article, it is prior known to add small amounts of either of the halogens bromine or iodine to such a mixed acid etch to enhance the etching effect. One such process, featuring bromine addition, is described in R. D. Heidenreich Patent 2,619,414 (here incorporated by reference). The Heidenreich patent takes further reference to the nature of the etching process, and to the manner of manufacturing semiconductors including such an etching step.

The precise chemical mechanism by which halogen addition aids in producing smooth surfaces is not fully understood; however, it is believed that the halogen may react with the nitric acid to produce iodic or bromic acid and nitrous acid, the latter being thought to be important to the even etching of silicon or germanium at a controlled rate. An explanation of the effect of bromine addition is contained in an article entitled, "The Chemical Polishing of Germanium," by B. A. Irving, appearing in the Journal of the Electrochemical Society, vol. 109, pp. 120–23, February 1962 (here incorporated by reference). Bromine or iodine is customarily added to a point at or near the saturation concentration, generally of the order of about 1–2% by weight of the etching solution.

IODINE MONOBROMIDE ETCHANTS

In accordance with the present invention, the interhalogen compound iodine monobromide is added to any of the mixed acid etches described in the preceding section. Iodine monobromide (IBr) is one of many interhalogen compounds reported in the technical literature. One description of this family of compounds is found in Comprehensive Inorganic Chemistry, by Sneed et al., volume III, "The Halogens," pp. 183–214 (1954), especially pp. 191–93. IBr forms brownish-black crystals, which melt at 42° C. to form a black liquid boiling at 116° C. The melting and boiling points of IBr are intermediate those of the constituent halogens. IBr is a strong oxidizing agent, and is quite soluble in water and glacial acetic acid.

Iodine monobromide is formed by mixing equimolecular proportions of the elements, the reaction having a low heat of formation. For the purposes of the present invention, it is not necessary to use pure IBr which is somewhat difficult to prepare. For practical purposes, excellent results are obtained by using a mixture of IBr in excess bromine. This insures complete reaction of the iodine and facilitates preparation and subsequent handling of the solutions.

*Example I*

According to one specific example of the invention, 360 grams of iodine were added slowly to 454 grams (144 ml.) of bromine at room temperature, with frequent stirring. This resulted in the formation of 230 ml. of solution consisting of a mixture of IBr in excess bromine. The precise physical state of this mixture is not known, and it is possible that some of the little known compound iodine tribromide ($IBr_3$) may be formed in the process. The presence or absence of this compound, reported on page 209 of the Sneed et al. textbook, has not been established.

The foregoing proportions utilize 1.42 mols of $I_2$ and 2.84 mols of $Br_2$. This yields, on a theoretical basis, 2.84 mols of IBr (587 grams) and 1.42 mols of excess bromine (227 grams), a 50% molecular excess (39% by weight). However, some of the bromine is lost to the atmosphere during formation of the IBr and in subsequent handling, because bromine is quite volatile (boiling point 58° C.). There is no objection to the presence of excess bromine in the etching solution, since bromine is an effective additive as disclosed in the literature previously cited. While the foregoing ratio of bromine to iodine is particularly advantageous in the practice of the invention, any convenient ratio can be used which will supply iodine monobromide, preferably with at least a slight excess of bromine.

Preferably, the IBr solution thus formed is immediately dissolved in glacial acetic acid (99.5% by weight) to form a stable premixture which may be stored for long periods. Acetic acid is convenient to use since it is one of the constituents of the etching solution to be formed. In the specific example, 514 grams of acetic acid (490 ml.) were added to the 230 ml. of IBr solution, forming 720 ml. of solution containing approximately 810 grams per liter of IBr, as well as a smaller amount of excess $Br_2$. It is also possible to add the IBr solution directly to the etching composition, but the preferred method permits compounding several batches in advance of use.

The etching is prepared in accordance with preferred embodiments of the invention by adding a predetermined amount of the solution of iodine monobromide in acetic acid to a mixed acid etch of one of the prior-known formulations discussed in the preceding section, the particular composition being compounded for the specific etching function to be performed. In general, the IBr solution is added to provide a total solution concentration between about 3 and 10 grams of IBr per liter of etchant although the invention is applicable to any concentration of IBr from more than a trace up to saturation with IBr which could, for example, be approximately 24 grams of IBr per liter in a "4:1:3 etch" of Example II now to be described.

*Example II*

One mixed acid etch which is frequently used for etching silicon slices to a mirror-bright finish is termed the "4:1:3 etch," which signifies 4 parts by volume of 70% nitric acid, 1 part by volume of 49% hydrofluoric acid, and 3 parts by volume of glacial acetic acid. In preparing an etchant in accordance with one specific example of the invention, 7 ml. of the IBr-acetic acid solution were slowly added to 1 liter of the 4:1:3 etch with stirring. This formulation provides an IBr concentration of about 5.7 grams per liter which is typical of the practice of the invention.

One or both sides of a slice of silicon are etched by this solution to a predetermined depth, by any known method. For best results, the etching solution is maintained at a temperature of about 40° C., which requires cooling after the etching reaction (exothermic) has started. This allows a controllable amount of silicon to be removed per unit time, and minimizes "rounding" of the edges of the slice. Typically, in this type of process, about 0.003–0.005 inch of silicon are removed, which requires an immersion time of about 15 to 25 minutes in the particular etchant.

In one typical method, the slice to be etched is mounted on a "Teflon" backing disc by a wax which is impervious to the reagents used, is immersed in the etching solution while being kept in motion throughout the immersion period, and is quenched in distilled water immediately after removal from the etchant to rinse off the etchant and arrest further etching. The etched slice is separated from the backing disc by melting the wax, and traces of the wax are removed by organic solvents.

*Extmple III*

Another mixed acid etch often used is the 5:1:4.4 etch, referring to parts by volume of 70% $HNO_3$, 49% HF and glacial acetic acid as before. This is a somewhat slower etchant, about 20% slower, because of the higher concentration of acetic acid. In this example, 7 ml. of the IBr-acetic acid sloution of Example I were added to 1 liter of the mixed acid as in Example II.

Silicon slices were etched in this reagent in the same manner previously described, except that a somewhat longer period of immersion is required for a given depth of etch.

*Example IV*

Germanium slices are etched in much the same manner, but employing a "stronger" etch; that is, one containing a higher concentration of HF, such as the formulations disclosed in the Heidenreich patent. A typical etching solution for germanium, commonly termed the "CP–4 etch," comprises 5 parts by volume of 70% $HNO_3$, 3 parts by volume of 49% HF, and 3 parts by volume of glacial acetic acid and bromine. Instead of the bromine usually added to the CP–4 etch, 7 ml. of the IBr solution of Example I are added per liter of etching solution to provide an especially advantageous solution for etching germanium.

Iodine monobromide solutions, as prepared herein, are more advantageous than iodine for use in halogen-containing etchants of the class described because this composition is more soluble in the etching solution, and is easy to add in controlled amounts. There is no need to age the solutions before using, and the concentration of halogen is easier to maintain. The addition of iodine to a point near saturation, to obtain desirable etching properties, is a difficult and time consuming operation. Also, problems arise in staining of equipment and due to crystallization of iodine. Further, the use of IBr is safer, simpler and more economical. Smoother etched surfaces are also achieved because IBr is more soluble than iodine, and is a somewhat stronger oxidizing agent.

Iodine monobromide is more advantageous than bromine because bromine is quite unstable in many of the etchants commonly used, particularly at the usual etching temperatures, due to its low boiling point. The etchants of Examples II and III are operated at 40° C., at which temperature bromine is close to its boiling point of 58° C. Therefore, it is always difficult to maintain the solution concentration of bromine. In addition, bromine vapors are toxic, so that special precautions must be taken.

While various specific examples and embodiments of the invention have been described in detail hereinbefore, it will be obvious that various modifications may be made from the specific details described without departing from the spirit and scope of the invention.

What is claimed is:

1. The method of etching a surface of a semiconductive material selected from the group consisting of silicon and germanium, which comprises treating the surface with a solution containing nitric acid, hydrofluoric acid and iodine monobromide, the amount of iodine monobromide in said solution ranging from more than a trace to saturation.

2. The method of etching a surface of a semiconductive material selected from the group consisting of silicon and germanium, which comprises treating the surface with a solution containing nitric acid, hydrofluoric acid and a composition of iodine and bromine prepared by mixing iodine with a molecular excess of bromine the amount of the composition in said solution ranging from more than a trace to saturation.

3. The method of etching a surface of a semiconductive material selected from the group consisting of silicon and germanium, which comprises treating the surface with an etching solution comprising nitric acid, hydrofluoric acid, acetic acid and iodine monobromide the amount of iodine monobromide in said solution ranging from more than trace to saturation.

4. The method as recited in claim 3, wherein the etching solution consists essentially of:

(a) 70% nitric acid ---------- parts by volume-- 1–6
(b) 49% hydrofluoric acid -------------do---- 1

(c) Glacial acetic acid -----------------do---- 1–10
(d) Iodine monobromide -------grams per liter-- 3–10

5. The method of chemically polishing a silicon surface, which comprises treating the surface with a mixture consisting essentially of:

(a) 70% nitric acid ---------- parts by volume-- 4–5
(b) 49% hydrofluoric acid ---------------do---- 1
(c) Glacial acetic acid ------------------do---- 3–5
(d) Iodine monobromide ------- grams per liter-- 4–7

6. A composition for etching the surface of semiconductive material consisting essentially of a solution of nitric acid, hydrobuoric acid and iodine monobromide, the amount of iodine monobromide in the solution ranging from more than a trace to saturation.

7. A composition for etching the surface of semiconductive material consisting essentially of a solution of nitric acid, hydrofluoric acid and a composition of iodine and bromine prepared by mixing iodine with a molecular excess of bromine, the amount of the composition of iodine and bromine in the solution ranging from more than a trace to saturation.

8. An etchant consisting essentially of:

(a) 70% nitric acid ----------parts by volume-- 1–6
(b) 49% hydrofluoric acid -------------do---- 1
(c) Glacial acetic acid -----------------do---- 1–10
(d) Iodine monobromide -------grams per liter-- 3–10

9. A chemical polishing solution for silicon, consisting essentially of:

(a) 70% nitric acid -----------parts by volume-- 4–5
(b) 49% hydrofluoric acid ---------------do---- 1
(c) Glacial acetic acid ------------------do---- 3–5
(d) Iodine monobromide --------grams per liter-- 4–7

10. A solution for etching the surface of semiconductive material consisting essentially of a solution of nitric acid, hydrofluoric acid, acetic acid and iodine monobromide, the amount of iodine monobromide in the solution ranging from more than a trace to saturation.

References Cited by the Examiner

UNITED STATES PATENTS

| | | | |
|---|---|---|---|
| 2,619,414 | 11/1952 | Heidenreich | 252—79.4 XR |
| 2,827,367 | 3/1958 | Cox | 252—79.3 XR |
| 2,871,110 | 1/1959 | Stead | 252—79.3 |
| 2,927,011 | 3/1960 | Stead | 252—79.4 |
| 2,983,591 | 5/1961 | Stead | 252—79.3 |
| 3,007,830 | 11/1961 | Bardsley | 252—79.3 XR |
| 3,117,899 | 1/1964 | McLouski | 252—79.3 XR |

References Cited by the Applicant

Electrochemical Technology, January-February 1964, pp. 51–52, by Richards et al.

Comprehensive Inorganic Chemistry, vol. III, pp. 183–85, 191–93 and 209, by Sneed et al.

Journal of the Electrochemical Society, vol. 107, pp. 810–16, October 1960, by D. R. Turner.

Journal of the Electrochemical Society, vol. 109, pp. 121–23, February 1962, by B. I. Irving.

The Sylvania Technologist, vol. 1, pages 50–57, April 1958, by P. Wang.

LEON D. ROSDOL, *Primary Examiner.*

JULIUS GREENWALD, *Examiner.*

M. WEINBLATT, *Assistant Examiner.*